June 30, 1925.
O. EPPENSTEIN
1,544,090
MEASURING DEVICE
Filed June 19, 1923
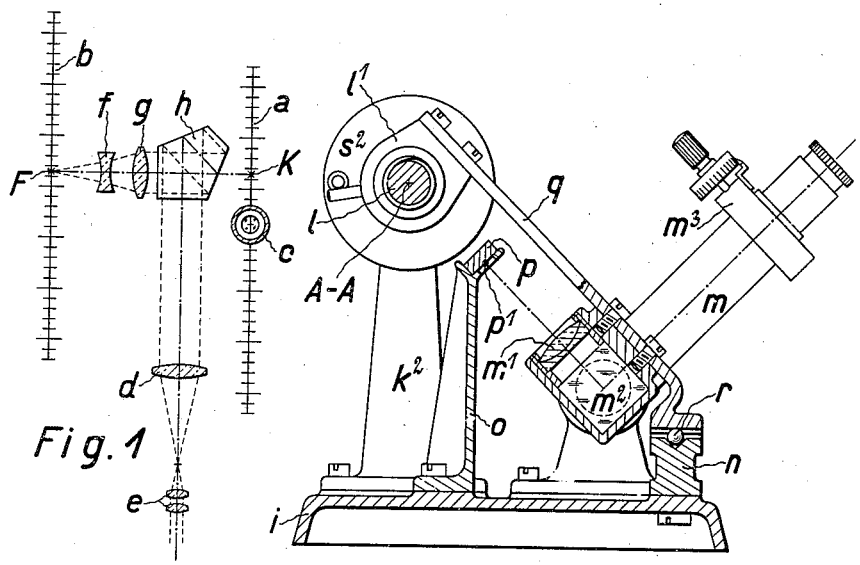
Fig. 1
Fig. 2
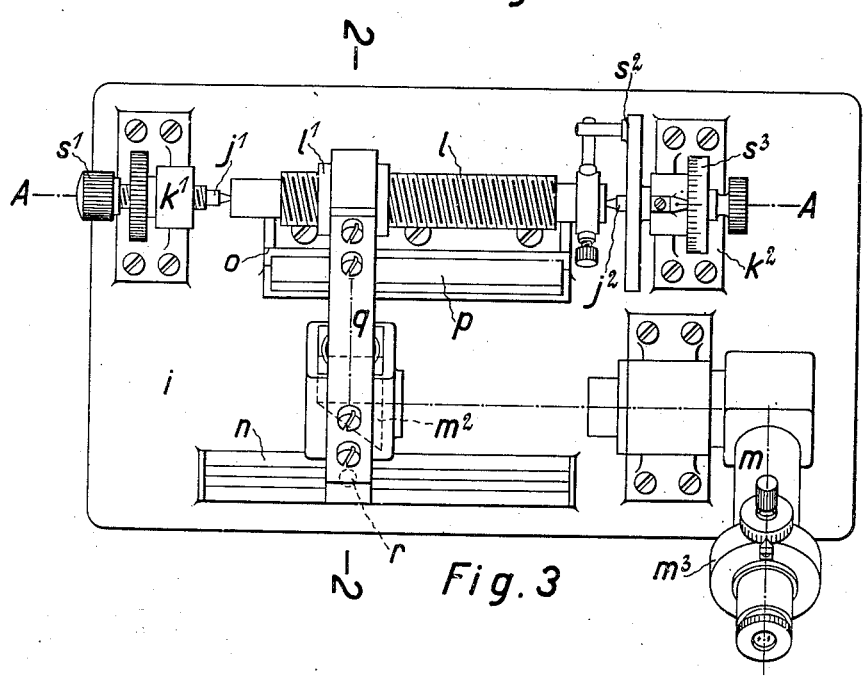
Fig. 3
Inventor:
Otto Eppenstein Patented June 30, 1925.

1,544,090

UNITED STATES PATENT OFFICE.

OTTO EPPENSTEIN, OF JENA, GERMANY, ASSIGNOR TO THE FIRM OF CARL ZEISS, OF JENA, GERMANY.

MEASURING DEVICE.

Application filed June 19, 1923. Serial No. 646,362.

*To all whom it may concern:*

Be it known that I, OTTO EPPENSTEIN, a citizen of Germany, and residing at Jena, Germany, have invented a new and useful Measuring Device (for which I have filed an application in Germany, July 15, 1922), of which the following is a specification.

The subject of the present invention forms an improvement of the measuring devices which serve for comparing two distances with each other. In order to be able to carry out such a comparison with the highest possible accuracy, it has proved suitable to dispose in these devices, according to a principle laid down by Ernst Abbe, the two distances to be compared in a straight line, i. e. in succession because in that case the result of the measurement is almost not affected by faulty deviations of the guides in which the parts to be displaced for carrying out the comparison, e. g. the two distances themselves are disposed. However, this arrangement has the drawback that the measuring device becomes comparatively long, viz, at least equal to double the length of the object to be measured, so that the aforesaid Abbe principle can, as a rule, only be applied in devices for shorter objects.

According to the present invention it is possible to attain the same accuracy of the measurement as hitherto by providing in a device, in which the two distances to be compared are disposed side by side, for sighting at one of the two distances a fixed sighting device in front of which there is disposed an optical system, displaceable parallelly to the distances, of which system firstly the optical axis lies in the plane determined by the two distances, of which secondly the front focal point lies on the distance to be sighted at by this system and of which thirdly that point lies on the other of the two distances which has the property that a ray aiming at it in the object-space emanates from the optical system at an angle to the axis which is equal to that on entering with respect to magnitude and sign.

The sighting device, which is suitably constructed as a telescope provided with a sighting mark, replaces in conjunction with the optical system disposed in front a displaceable microscope as hitherto used for sighting at a distance in the devices of the present kind. It can easily be proved that with the arrangement according to the invention of the displaceable, optical system, also with the distances lying side by side, the errors of the measurement arising through faulty deviations of the guides keep within the same limits as in the event of adhering to the aforesaid Abbe principle, by taking into account that also with rotations of the optical system, located in front of the sighting device, about the above described point the direction of the pencil of parallel rays emerging from the system is preserved, and that a rotation about any axis perpendicular to the plane containing the two distances can be replaced by a rotation about an axis passing through this point of the movable optical system and being also perpendicular to the said plane and by a displacement in this plane.

Of course, the optical system located in front of the sighting device must be so constructed that even with a displacement the ray pencil emerging from it always gets into the sighting device. In order to attain this result, the system must contain besides a number of lenses a number of reflecting surfaces by which the ray pencil is deflected in the requisite way. If the number of reflecting surfaces present be even, the aforesaid point of the system is formed by the front positive nodal point of the lens arrangement. If, however, the number of reflecting surfaces be odd, it is the front negative nodal point of the lens arrangement which, owing to the inversion of the image effected in this case by the mirrors, forms the aforesaid point of the whole displaceable system. The use of an odd number of reflecting surfaces may, for instance, prove necessary if a lens arrangement be chosen, whose front positive nodal point is not accessible, e. g. because it lies within a lens.

Fig. 1 of the annexed drawing diagrammatically shows a device for comparing two scales. Fig. 2 is a side elevation of a constructural example and Fig. 3 a plan elevation thereof.

The scales of the device shown in Fig. 1 are denoted by *a* and *b*. The first-named scale is sighted at by means of a microscope *c* which is disposed perpendicularly to the drawing plane. For sighting at the scale *b*, whose single divisions are actually directed perpendicularly to the drawing plane, serves a fixed sighting telescope consisting of an objective *d* and an ocular *e*, in front of which telescope there is disposed an optical system consisting of a dispersive lens $f$, a collective lens $g$ and a pentagonal prism $h$. The optical axis of this system lies just as that of the telescope in the plane determined by the scales $a$ and $b$. The microscope $c$ and the optical system $f$, $g$, $h$ are rigidly connected and jointly displaceable in a guide parallelly to the scales $a$ and $b$. The front focal point of the lens system $f$, $g$, denoted by F, lies on the scale $b$, so that the pencil of rays imaging the scale $b$ and emanating from the prism $h$ and entering the telescope $d$, $e$ consists of parallel rays. The front positive nodal point of the system $f$, $g$, denoted by K, lies on the scale $a$.

If it be desired to compare the scales $a$ and $b$, it is necessary to adjust successively, by displacing the system $f$, $g$, $h$ and the microscope $c$, either the microscope $c$ or the system $f$, $g$, $h$ to different divisions of the respective scale and to read off in the other displaceable part the position of the corresponding divisions of the other scale relatively to the respective sighting mark. As the guide in which the microscope $c$ and the system $f$, $g$, $h$ are displaceable is generally not exactly straight-lined, the microscope $c$ and the system $f$, $g$, $h$ generally experience with a displacement an additional rotation. However, it is obvious that with the arrangement chosen a slight rotation of the displaceable parts about an axis parallel to the scales $a$ and $b$ and about an axis containing the focal point F and the nodal point K as well as about an axis passing through the nodal point K and being perpendicular to the drawing plane and therefore also about an axis running in an optional direction only causes reading errors of the second order and is consequently harmless.

In the device shown in Figs. 2 and 3 there is fixed upon a base plate $i$ a gripping appliance for a screw spindle $l$, consisting of two bearing pedestals $k^1$ and $k^2$ provided with points $j^1$ and $j^2$. In addition, the base plate $i$ carries a sighting telescope $m$ having a broken axis, a guide bar $n$ and upon a support $o$ a measure $p$ with a scale $p^1$. On the spindle $l$, of which the whole length or a part of it represents the distance, which is to be compared with the scale $p^1$, there is disposed a nut $l^1$. To the latter is fixed by its one end a bridge $q$ which rests by its other end by means of a ball $r$ on the guide bar $n$. This bridge carries an optical system which consists of a collective lens $m^1$ and a rectangular, isosceles prism $m^2$, whose hypotenusal surface forms a reflecting surface, and which in conjunction with this sighting telescope $m$ serves for sighting at the scale $p^1$. The system $m^1$, $m^2$, whose optical axis runs in the plane determined by the common axis A—A of the points $j^1$ and $j^2$ and by the scale $p^1$, is constructed and disposed in such a way that its focal point lies on the scale $p^1$ and the front negative nodal point of the collective lens $m^1$ in the axis A—A. Of the points $j^1$ and $j^2$ of the gripping appliance the former, $j^1$, is displaceable in the bearing pedestal $k^1$ with the aid of a screw $s^1$ in the axial direction, whilst the latter, $j^2$, which carries, on the one hand a stud $s^2$ for the screw bolt $l$ and, on the other hand, a drum $s^3$ fitted with a scale, is rotatable about its axis but not displaceable in the direction of this axis. Finally it may be mentioned that the telescope $m$ is provided with a micrometer ocular $m^3$.

If it be desired to examine with this device the pitch of the screw bolt $l$, it is necessary to rotate repeatedly the point $j^2$ with the aid of the drum $s^3$, e. g. through 360° each, whereby the nut $l^1$ and consequently the bridge $q$ and the optical system $m^1$, $m^2$ are displaced in the direction of the bolt-axis A—A. The amount of the displacement is then read off on the scale $p^1$ with the aid of the micrometer ocular $m^3$.

I claim:

In a device for comparing two distances, running parallelly to each other, a fixed sighting device adapted to observe the one of these two distances, an optical system located in front of the said sighting device and displaceable parallelly to these distances, the optical axis of which system lies in the plane determined by these two distances, the front focal point of which system lies on the distance to be sighted at with this system and of which system that point lies on the other of the two distances which has the property that a ray aiming at it in the object-space emanates from the said optical system at an angle to the axis which is equal to that on entering with respect to magnitude and direction, and means for ascertaining the position of the said optical system with respect to the other distance.

OTTO EPPENSTEIN.